(12) United States Patent
Kang

(10) Patent No.: US 6,427,545 B1
(45) Date of Patent: Aug. 6, 2002

(54) STRENGTH TESTER FOR AUTOMOBILE DOOR HANDLE

(75) Inventor: Hee-Won Kang, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/693,710

(22) Filed: Oct. 20, 2000

(30) Foreign Application Priority Data

Dec. 31, 1999 (KR) .................................. 99-68336

(51) Int. Cl.[7] .............................................. G01N 19/00
(52) U.S. Cl. ...................................................... 73/865.9
(58) Field of Search ............................. 73/865.9, 760, 73/774, 788

(56) References Cited

U.S. PATENT DOCUMENTS 3,918,744 A * 11/1975 Gay ........................ 280/415 B
4,615,286 A * 10/1986 Linton ......................... 111/52
5,464,078 A * 11/1995 Pittman ....................... 188/112

FOREIGN PATENT DOCUMENTS

JP 2001141613 * 5/2001

* cited by examiner

Primary Examiner—Max Noori
(74) Attorney, Agent, or Firm—Christie, Parker & Hale, LLP

(57) ABSTRACT

A strength tester for automobile door handle adapted to allow a strength test manually performed on a door handle equipped at an outer handle part of the door to be performed by an external force generated from a mechanical device, thereby providing a safety to a tester, convenience in testing and ease of testing of breakage strength upto destruction of the door handle, the tester comprising: a work surface table of a predetermined size; a movable member installed on the work surface table for linear motion; an actuator installed to provide an operating force to the movable member; a plurality of link members rotably mounted at the movable member and axially supported via a rotary support point to the work surface table; and a hitching loop connected to the link member.

7 Claims, 2 Drawing Sheets

STRENGTH TESTER FOR AUTOMOBILE DOOR HANDLE

BACKGROUND OF THE INVENTION

1. Field of the Invention

The present invention relates to a strength tester for automobile door handle, and more particularly to a strength tester for automobile door handle adapted to easily measure the strength of a grip-type door handle.

2. Description of the Prior Art

Generally, an automobile is mounted with doors, each door being hinged at one side thereof to the body for loading and unloading passengers. The door is equipped with a locking device for changing the door from a locking state to an unlocking state by manipulating same from inside or outside of the automobile.

In other words, the locking device includes an inner handle part and an outer handle part respectively equipped at the door from inside and outside of the automobile, and a latch assembly body independently operated by manipulation of the inner handle part and the outer handle part to change a locked state of the door to an unlocked state.

Meanwhile, the outer handle part is usually provided with a door handle for a user to hold, where the door handle should go through a strength test for discriminating whether a predetermined standard of strength has been met after manufactured according to the design thereof. A strength measuring gauge called as push and pull gauge is generally used for strength test of door handle at the outer handle part.

In other words, the strength measuring gauge is installed on the door handle at the outer handle part of the door in a state where the door is changed from an unlocked state to a locked state and a tester pulls the strength measuring gauge. A perpetual deformation of the door handle relative to load applied to the door handle is measured to determine whether or not there is any deformation.

However, there is a disadvantage in the strength test on the door handle of the outer handle part at the door according to the prior art thus described in that a tester should perform a manual operation every time utilizing the strength measuring tester.

There is another disadvantage in that a breakage strength test of the door handle can hardly be performed except that the gauge can test the perpetual deformation generated from the door handle by load applied thereto.

SUMMARY OF THE INVENTION

The present invention is disclosed to solve the aforementioned problems and it is an object of the present invention to provide a strength tester for automobile door handle adapted to allow a strength test manually performed on a door handle equipped at an outer handle part of the door to be performed by an external force generated from a mechanical device, thereby providing a safety to a tester, convenience in testing and ease of testing of breakage strength upto destruction of the door handle.

In accordance with the object of the present invention, there is provided a strength tester for automobile door handle, the tester comprising:

a work surface table of a predetermined size;

a movable member installed on the work surface table for linear motion;

an actuator installed to provide an operating force to the movable member;

a plurality of link members rotably mounted at the movable member and axially supported via a rotary support point to the work surface table; and a hitching loop connected to the link member.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiment of the present invention will now be described in detail with reference to the accompanying drawings.

Figure 1:
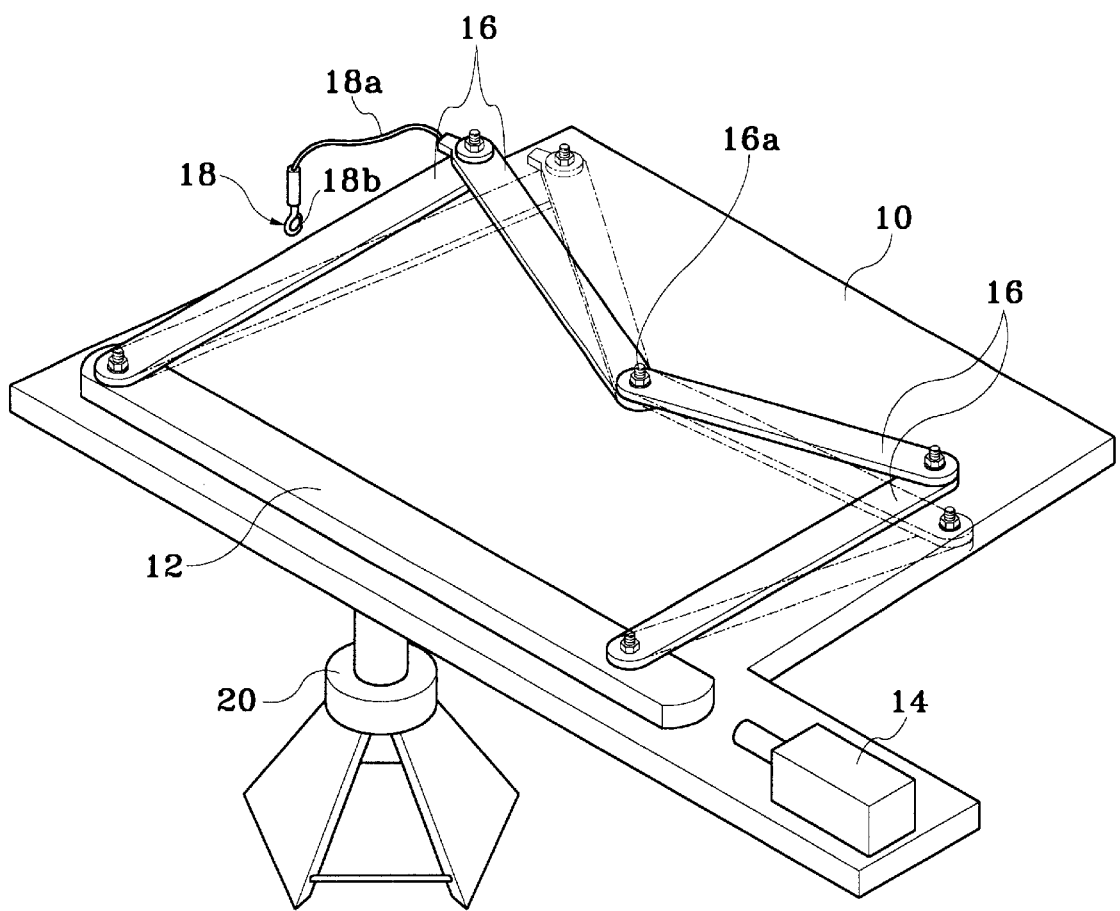
FIG. 1 is a schematic drawing for illustrating a construction of a strength testing device for door handle of an automobile according to the present invention.
Figure 2:
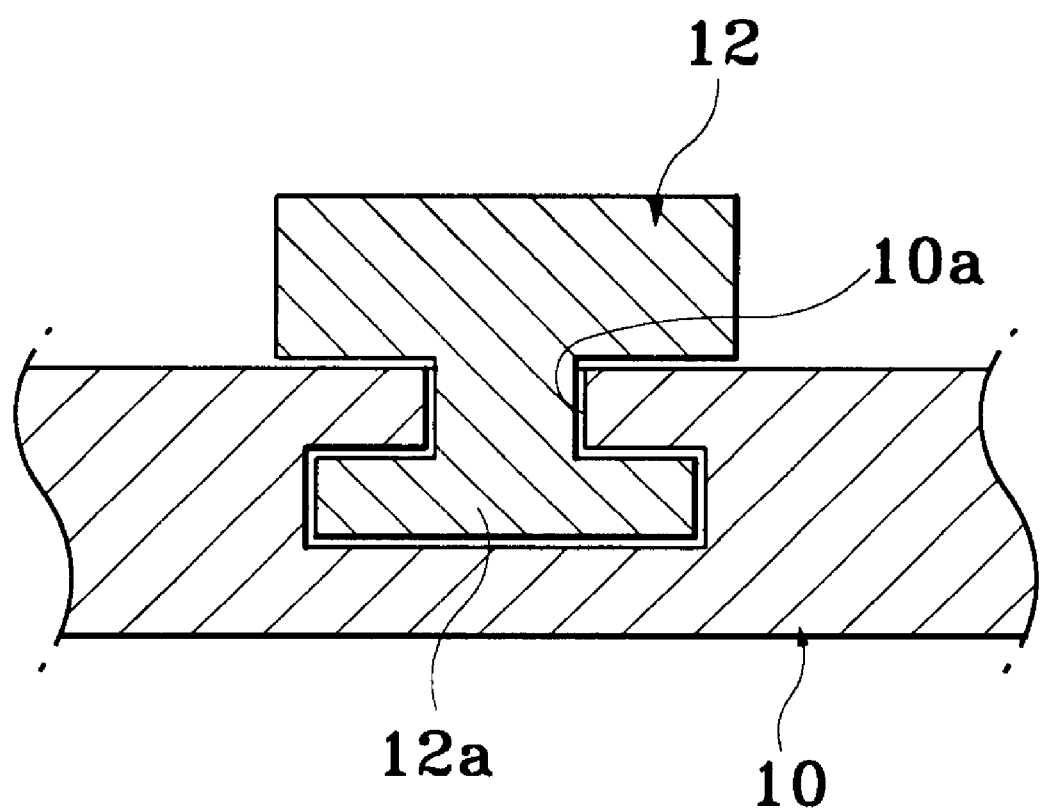
FIG. 2 is a sectional view for illustrating a mounted state of principal parts shown in FIG. 1.

FIG. 1 is a schematic drawing for illustrating a construction of a strength testing device for door handle of an automobile according to the present invention; and FIG. 2 is a sectional view for illustrating a mounted state of principal parts shown in FIG. 1.

As illustrated in the drawings, the strength tester according to the present invention includes a movable member 12 installed on a work surface table 10 of a predetermined size for linear motion, a hydraulic or pneumatic actuator 14 laterally at the movable member 12 installed to provide an operating force to the movable member 12, a plurality link members 16 rotably mounted at both tip ends of the movable member 12 and axially supported at a central portion thereof to the work surface table 10 via a rotary support point 16a and a hitching loop 18 connected to a tip end of the link member 16 via a wire 18a of high strength.

The movable member 12 is integrally formed with a hitching unit 12a for linear movement along a guide rail 10a formed on the work surface table 10 and for preventing deviation therefrom, as illustrated in FIG. 2.

Furthermore, the hitching loop 18 is arranged with a safety hitching pin 18b and when an object is hitched by the hitching loop 18, the safety hitching pin 18b serves to prevent deviation of the object.

Meanwhile, the work surface table 10 is mounted thereunder with a support member 20 perpendicularly mounted to the ground and artificially adjustable in its height of the work surface table 10. When a strength test is performed against grip type door handle mounted for a user to hold the outer handle part of the door, the hitching loop 18 is first inserted into the grip type door handle. Then, the safety hitching pin 18b is manipulated to forcibly prevent the door handle from being deviated from the hitching loop 18 to actuate the actuator 14 mounted on the work surface table 10.

At this time, when the actuator 14 is made to push the movable member 12, the actuator 14 starts to join the movable member 12, where the link member 16 rotably installed on the work surface table 10 via the rotary support point 16a pulls the hitching loop 18 via the wire 18a.

When the door handle is broken by the external force generated by operation of the actuator 14, degree of load applied to the actuator 14 upto the movement can be calculated by a load measuring device. When the strength test of the door handle is performed as above by the mechanical device for determining whether or not strength regulation of a predetermined standard has been met after the grip-type door handle is produced, tester's convenience and safety can be considered.

As apparent from the foregoing, there is an advantage in the strength tester for automobile door handle thus described according to the present invention in that strength test for the grip-type door handle is performed through the hydraulic or pneumatic actuator 14, the movable member 12 and the plurality of link members 16, such that tester's convenience can be enhanced and breakage test of the door handle can be easily performed as well.

What is claimed is:

1. A strength tester for an automobile door handle, the tester comprising:
   a work surface table of a predetermined size;
   a movable member installed on the work surface table for linear motion;
   an actuator installed to provide an operating force to the movable member and having a load measuring device for measuring the amount of load applied by the actuator;
   a plurality of link members, wherein at least one of said plurality of link members are rotatably coupled to the moveable member and wherein at least one of said plurality of link members is axially supported via a rotary support point to the work surface table; and
   a hitching loop connected to one of said plurality of link members and hitched on to an automobile door handle to be tested.

2. The tester of claim 1, wherein the movable member is coupled to a guide rail formed on the work surface table and is formed with a hitching unit for being inserted to the guide rail for guided movement and for being hitched by the guide rail so as not to be detached therefrom.

3. The tester of claim 1 wherein at least two of said plurality of links are rotatably mounted on the moveable member and wherein two of said plurality of links are axially supported by a rotary support point to the work surface table.

4. A strength tester for an automobile door handle, the tester comprising:
   a work surface table;
   a movable member slidably coupled to the work surface table;
   an actuator for providing an operating force to the movable member;
   a first link member rotatably coupled to the moveable member about a first axis;
   a second link member rotatably coupled to the moveable member about a second axis;
   a third link member rotatably coupled to the first link member about a third axis spaced apart from the first axis and rotatably mounted about a fourth axis to the work surface table;
   a fourth link member rotatably coupled to the second link member about a fifth axis spaced apart from the second axis and rotatably mounted about the fourth axis to the work surface table; and
   a hitching loop connected to one of said link members for hitching on to a door handle to be tested.

5. The tester of claim 4 further comprising a guide rail formed on the work surface table for guiding the movement of the moveable member along a linear path.

6. The tester of claim 5 wherein the guide rail comprises a groove formed on the work surface table.

7. The tester of claim 6 wherein the guide rail groove comprises a first portion and a second portion located deeper than the first portion wherein the second portion is wider than the first portion and wherein the moveable member comprises a protrusion slideably fitted into the groove wherein the protrusion comprises a first portion slidably fitted in the first portion of the groove and a second portion slideably fitted in the second portion of the groove wherein the width of the portursion second portion is greater than the width of the groove first portion.

* * * * *